(12) United States Patent  (10) Patent No.: US 8,773,338 B2
Miyake  (45) Date of Patent: Jul. 8, 2014

(54) METHOD FOR DRIVING LIQUID CRYSTAL DISPLAY DEVICE

(75) Inventor: Hiroyuki Miyake, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 739 days.

(21) Appl. No.: 13/005,565

(22) Filed: Jan. 13, 2011

(65) Prior Publication Data

US 2011/0175873 A1 Jul. 21, 2011

(30) Foreign Application Priority Data

Jan. 20, 2010 (JP) ................................ 2010-009681

(51) Int. Cl.
G09G 3/36 (2006.01)
(52) U.S. Cl.
USPC ................. 345/87; 345/89; 345/204; 349/41; 349/42
(58) Field of Classification Search
USPC ........ 345/87–100, 204, 690–693; 349/38, 39, 349/48, 49, 144, 41, 42
See application file for complete search history.

(56) References Cited

U.S. PATENT DOCUMENTS

2006/0215066 A1* 9/2006 Ueda et al. ....................... 349/38
2008/0043160 A1* 2/2008 Park et al. ........................ 349/38
2009/0027578 A1* 1/2009 You et al. ......................... 349/39
2009/0207330 A1* 8/2009 Jung et al. ........................ 349/39
2009/0244426 A1 10/2009 Hasegawa et al.
2011/0201162 A1* 8/2011 Hosono et al. ................. 438/163

FOREIGN PATENT DOCUMENTS

JP 2005-024680 A 1/2005
JP 2009-237297 A 10/2009

OTHER PUBLICATIONS

Tsuda.K et al., "Ultra Low Power Consumption Technologies for Mobile TFT-LCDs," IDW '02: Proceedings of the 9th International Display Workshops, Dec. 4, 2002, pp. 295-298.
Chen.Y et al., "Novel Low Power Consumption Color Sequential Display," IDW '09: Proceedings of the 16th International Display Workshops, Dec. 9, 2009, pp. 1703-1706.
International Search Report (Application No. PCT/JP2010/073897) Dated Mar. 15, 2011.
Written Opinion (Application No. PCT/JP2010/073897) Dated Mar. 15, 2011.

* cited by examiner

*Primary Examiner* — Jennifer Nguyen
(74) *Attorney, Agent, or Firm* — Eric J. Robinson; Robinson Intellectual Property Law Office, P.C.

(57) ABSTRACT

In an image signal writing period, a first image signal is supplied to a first liquid crystal element and a first capacitor from a first signal line. In a backlight lighting period, display is performed in a light-transmitting pixel portion in response to the first image signal. In a black grayscale signal writing period, a signal for black display is supplied to a second liquid crystal element and a second capacitor from a second signal line. In a still image signal writing period, a second image signal is supplied to the first liquid crystal element, the first capacitor, the second liquid crystal element, and the second capacitor from the first signal line. In a still image signal holding period, display is performed in the reflective pixel portion in response to the second image signal.

29 Claims, 9 Drawing Sheets

|  | 60frame~/sec. | 1frame~/min. |
|---|---|---|
|  | moving image display period 301 | still image display period 302 |
| driver circuit control signal | operating | non-operating except at the time of writing of an image signal |
| backlight | operating | non-operating |
| light-transmitting pixel portion | COLOR | BK/W |
| reflective pixel portion | BK | BK/W |

METHOD FOR DRIVING LIQUID CRYSTAL DISPLAY DEVICE

TECHNICAL FIELD

The present invention relates to a method for driving a liquid crystal display device. Alternatively, the present invention relates to a liquid crystal display device. Further alternatively, the present invention relates to an electronic device including a liquid crystal display device.

BACKGROUND ART

Liquid crystal display devices are widely used in large display devices such as television receivers and small display devices such as mobile phones. Products with higher added values are required and are being developed. In recent years, in view of increase in concern about global environment and improvement in convenience of mobile equipment, development of liquid crystal display devices with low power consumption has attracted attention.

Non-Patent Document 1 discloses a structure of a liquid crystal display device in which refresh rates differ between the case of moving image display and the case of still image display for reduction in power consumption of the liquid crystal display device.

Non-Patent Document 2 discloses a structure of a semi-transmissive liquid crystal display device in which color image display performed by field sequential driving and monochrome image display performed by turning off a backlight and using reflected light are switched for reduction in power consumption of the liquid crystal display device.

REFERENCE

[Non-Patent Document 1] Kazuhiko Tsuda et al., IDW'02, pp. 295-298

[Non-Patent Document 2] Ying-hui Chen et al., IDW'09, pp. 1703-1707

DISCLOSURE OF INVENTION

According to Non-Patent Document 1, power consumption can be reduced by lowering the refresh rate in displaying a still image. However, since power consumption of a liquid crystal display device largely depends on lighting of a backlight, the structure of Non-Patent Document 1 has a problem in that power consumption is not sufficiently reduced. The structure of Non-Patent Document 2 has a problem in that field sequential driving in a semi-transmissive liquid crystal display device leads to insufficient contrast of a display image due to light scattering or the like in a reflective pixel portion, especially under intense outside light.

Thus, an object of an embodiment of the present invention is to suppress reduction in contrast due to light scattering or the like in a reflective pixel portion and to reduce power consumption.

An embodiment of the present invention is a method for driving a semi-transmissive liquid crystal display device including a plurality of pixels. Each of the pixels has a light-transmitting pixel portion and a reflective pixel portion. The light-transmitting pixel portion includes a first pixel transistor whose first terminal is electrically connected to a first signal line and whose gate is electrically connected to a scan line, and a first liquid crystal element and a first capacitor which are electrically connected to a second terminal of the first pixel transistor. The reflective pixel portion includes a second pixel transistor whose first terminal is electrically connected to the second terminal of the first pixel transistor and whose gate is electrically connected to a first selection line, a second liquid crystal element and a second capacitor which are electrically connected to a second terminal of the second pixel transistor, and a third pixel transistor whose first terminal is electrically connected to a second signal line, whose gate is electrically connected to a second selection line, and whose second terminal is electrically connected to the second liquid crystal element and the second capacitor. In the method for driving the semi-transmissive liquid crystal display device, in a first period, the first pixel transistor is turned on, the second pixel transistor is turned off, the third pixel transistor is turned off, and a first image signal is supplied to the first liquid crystal element and the first capacitor from the first signal line. In a second period, display is performed in the light-transmitting pixel portion in response to the first image signal supplied in the first period. In a third period, the first pixel transistor is turned off, the second pixel transistor is turned off, the third pixel transistor is turned on, and a signal for black display is supplied to the second liquid crystal element and the second capacitor from the second signal line in the reflective pixel portion. The first to third periods are repeated so that a moving image is displayed. In a fourth period, the first pixel transistor is turned on, the second pixel transistor is turned on, the third pixel transistor is turned off, and a second image signal is supplied to the first liquid crystal element, the first capacitor, the second liquid crystal element, and the second capacitor from the first signal line. In a fifth period, display is performed in the reflective pixel portion in response to the second image signal supplied in the fourth period. The fourth period and fifth period are repeated so that a still image is displayed.

An embodiment of the present invention may be a method for driving a liquid crystal display device, in which the first image signal supplied in the first period is an image signal corresponding to any color of R, G, and B, and backlights which emit respective colors of R, G, and B are sequentially operated in the second period.

An embodiment of the present invention may be a method for driving a liquid crystal display device, in which the second image signal is an image signal for displaying an image at a lower grayscale level than an image of the first image signal.

An embodiment of the present invention may be a method for driving a liquid crystal display device, in which time for displaying one image in the fourth and fifth periods is longer than time for displaying one image in the first to third periods.

An embodiment of the present invention may be a method for driving a liquid crystal display device, in which supply of a driver circuit control signal for driving the scan line and the first signal line is stopped in the fifth period.

According to an embodiment of the present invention, reduction in contrast due to light scattering or the like in a reflective pixel portion can be suppressed and power consumption can be reduced without making the structure complicated, for example, increase in the number of driver circuits, wirings, and the like.

BEST MODE FOR CARRYING OUT THE INVENTION

Hereinafter, embodiments of the present invention will be described with reference to the drawings. Note that the present invention can be implemented in many different modes, and it is easily understood by those skilled in the art that modes and details of the present invention can be modified in various ways without departing from the spirit and the scope of the present invention. Therefore, the present invention is not construed as being limited to the description of the embodiments. Note that in structures of the present invention described below, reference numerals denoting the same portions are used in common in different drawings.

Note that the size, the thickness of a layer, the waveform of a signal, and a region of components illustrated in the drawings and the like in the embodiments are exaggerated for simplicity in some cases. Therefore, the embodiments of the present invention are not limited to such scales.

Note that in this specification, terms such as "first", "second", "third", and "N-th" (N is a natural number) are used in order to avoid confusion among components and do not limit the components numerically.

Embodiment 1

In this embodiment, a method for driving a liquid crystal display device will be described with reference to circuit diagrams of a pixel of the liquid crystal display device, timing charts showing operation thereof, and the like.

Figure 1:
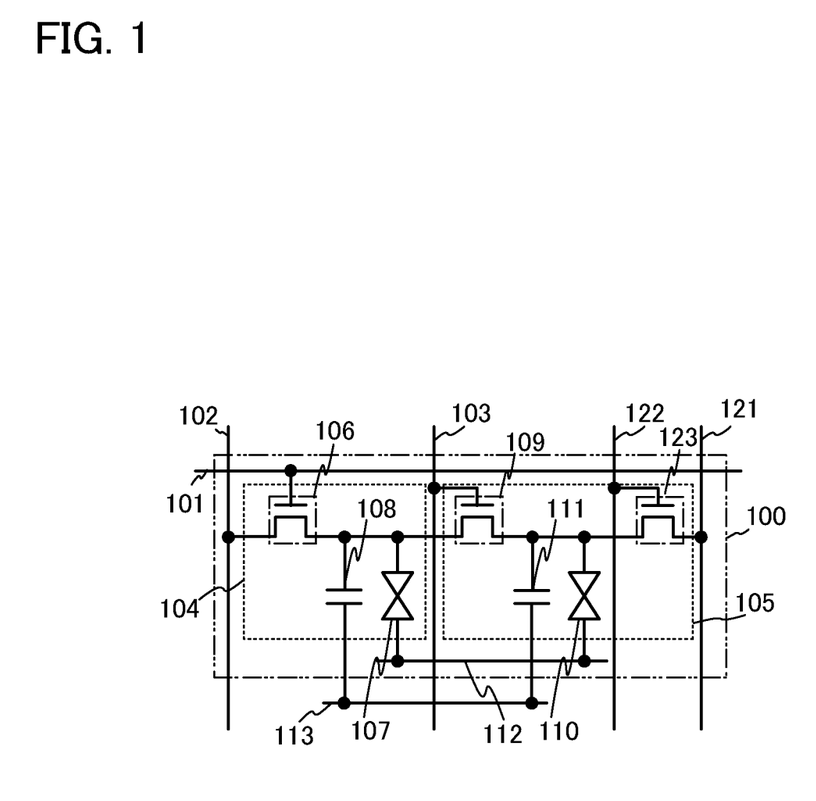
FIG. 1 is a diagram illustrating a liquid crystal display device of an embodiment of the present invention.

First, a configuration will be described with reference to FIG. 1 which is a circuit diagram of a pixel. FIG. 1 illustrates a pixel 100, a scan line 101 (also referred to as a gate line), a first signal line 102 (also referred to as a data line), a second signal line 121, a first selection line 103, and a second selection line 122. The pixel 100 has a light-transmitting pixel portion 104 and a reflective pixel portion 105. The light-transmitting pixel portion 104 includes a first pixel transistor 106, a first liquid crystal element 107, and a first capacitor 108. The reflective pixel portion 105 includes a second pixel transistor 109, a third pixel transistor 123, a second liquid crystal element 110, and a second capacitor 111.

In the light-transmitting pixel portion 104, a first terminal of the first pixel transistor 106 is connected to the first signal line 102 and a gate of the first pixel transistor 106 is connected to the scan line 101. A first electrode (pixel electrode) of the first liquid crystal element 107 is connected to a second terminal of the first pixel transistor 106, and a second electrode (counter electrode) of the first liquid crystal element 107 is connected to a common potential line 112 (common line). A first electrode of the first capacitor 108 is connected to the second terminal of the first pixel transistor 106, and a second electrode of the first capacitor 108 is connected to a capacitor line 113.

In the reflective pixel portion 105, a first terminal of the second pixel transistor 109 is connected to the second terminal of the first pixel transistor 106 and a gate of the second pixel transistor 109 is connected to the first selection line 103. A first terminal of the third pixel transistor 123 is connected to the second signal line 121, and a gate of the third pixel transistor 123 is connected to the second selection line 122. A first electrode (pixel electrode) of the second liquid crystal element 110 is connected to a second terminal of the second pixel transistor 109 and a second terminal of the third pixel transistor 123, and a second electrode (counter electrode) of the second liquid crystal element 110 is connected to the common potential line 112. A first electrode of the second capacitor 111 is connected to the second terminal of the second pixel transistor 109 and the second terminal of the third pixel transistor 123, and a second electrode of the second capacitor 111 is connected to the capacitor line 113.

Note that each of the first pixel transistor 106, the second pixel transistor 109, and the third pixel transistor 123 is preferably a transistor including an oxide semiconductor layer. The oxide semiconductor is made to be intrinsic (i-type) by removal of hydrogen that is an n-type impurity to be purified so that impurities that are not main components of the oxide semiconductor are included as few as possible. Note that a purified oxide semiconductor includes extremely few carriers (close to zero), and the carrier concentration thereof is lower than $1 \times 10^{14}/cm^3$, preferably lower than $1 \times 10^{12}/cm^3$, more preferably $1 \times 10^{11}/cm^3$. Since the oxide semiconductor includes extremely few carriers, the off-state current of the transistor can be reduced. Specifically, in a transistor including the above oxide semiconductor layer, the off-state current per micrometer in channel width at room temperature can be reduced to less than or equal to 10 aA/μm ($1 \times 10^{-17}$ A/μm), further to less than or equal to 1 aA/μm ($1 \times 10^{-18}$ A/μm), still further to less than or equal to 10 zA/μm ($1 \times 10^{-20}$ A/μm). That is to say, in circuit design, the oxide semiconductor can be regarded as an insulator when the transistor is off. In the pixel 100 that is a pixel including the transistors which are formed using the oxide semiconductor and whose off-state current is extremely small, an image can be maintained even when the number of times of writing of an image signal (also referred to as video voltage, a video signal, or video data) is small and thus the refresh rate can be lowered. Therefore, a period in which a driver circuit for driving the scan line and the signal line is stopped can be provided and power consumption can be reduced.

Note that a transistor is an element having at least three terminals of a gate, a drain, and a source. The transistor includes a channel region between a drain region and a source region, and current can flow through the drain region, the channel region, and the source region. Here, since the source and the drain may change depending on the structure, the operating condition, and the like of the transistor, it is difficult to define which is a source or a drain. Therefore, in this document (the specification, the claims, the drawings, and the like), a region functioning as a source and a drain is not called the source or the drain in some cases. In such a case, for example, one of the source and the drain may be referred to as a first terminal and the other thereof may be referred to as a second terminal. Alternatively, one of the source and the drain may be referred to as a first electrode and the other thereof may be referred to as a second electrode. Further alternatively, one of the source and the drain may be referred to as a source region and the other thereof may be referred to as a drain region.

Note that when it is explicitly described that "A and B are connected," the case where A and B are electrically connected, the case where A and B are functionally connected, and the case where A and B are directly connected are included therein.

Note that voltage refers to a potential difference between a given potential and a reference potential (e.g., a ground potential) in many cases. Accordingly, voltage, a potential, and a potential difference can be referred to as a potential, voltage, and a voltage difference, respectively.

Note that a common potential supplied to the common potential line 112 may be any potential as long as it serves as a reference with respect to a potential of an image signal supplied to the first electrode of the liquid crystal element, and may be a ground potential, for example.

Note that an image signal may be appropriately inverted in accordance with dot inversion driving, source line inversion driving, gate line inversion driving, frame inversion driving, or the like to be input to each pixel. Note also that the image signal is referred to by another name such as a first image signal or a second image signal in some cases, depending on the kind of an image to be displayed.

Note that the potential of the capacitor line 113 may be the same as the common potential. Alternatively, another signal may be supplied to the capacitor line 113.

Note that the second electrodes of the first liquid crystal element 107 and the second liquid crystal element 110 are preferably provided to overlap with the first electrodes of the first liquid crystal element 107 and the second liquid crystal element 110. The first electrodes and the second electrodes of the liquid crystal elements may each have a shape including a variety of opening patterns. As a liquid crystal material provided between the first electrodes and the second electrodes in the liquid crystal elements, thermotropic liquid crystal, low-molecular liquid crystal, high-molecular liquid crystal, polymer dispersed liquid crystal, ferroelectric liquid crystal, anti-ferroelectric liquid crystal, or the like may be used. These liquid crystal materials exhibit a cholesteric phase, a smectic phase, a cubic phase, a chiral nematic phase, an isotropic phase, or the like depending on conditions. Alternatively, liquid crystal exhibiting a blue phase for which an alignment film is unnecessary may be used.

Note that the first electrode of the first liquid crystal element 107 in the light-transmitting pixel portion 104 is formed using a light-transmitting material. As examples of the light-transmitting material, indium tin oxide (ITO), zinc oxide (ZnO), indium zinc oxide (IZO), zinc oxide to which gallium is added (GZO), and the like are given. On the other hand, a metal electrode with high reflectivity is used as the first electrode of the second liquid crystal element 110 in the reflective pixel portion 105. Specifically, aluminum, silver, or the like is used. In addition, outside light can be reflected irregularly by making a surface of the pixel electrode of the second liquid crystal element 110 uneven. Note that the first electrode, the second electrode, and the liquid crystal material are collectively referred to as a liquid crystal element in some cases.

Figure 2:
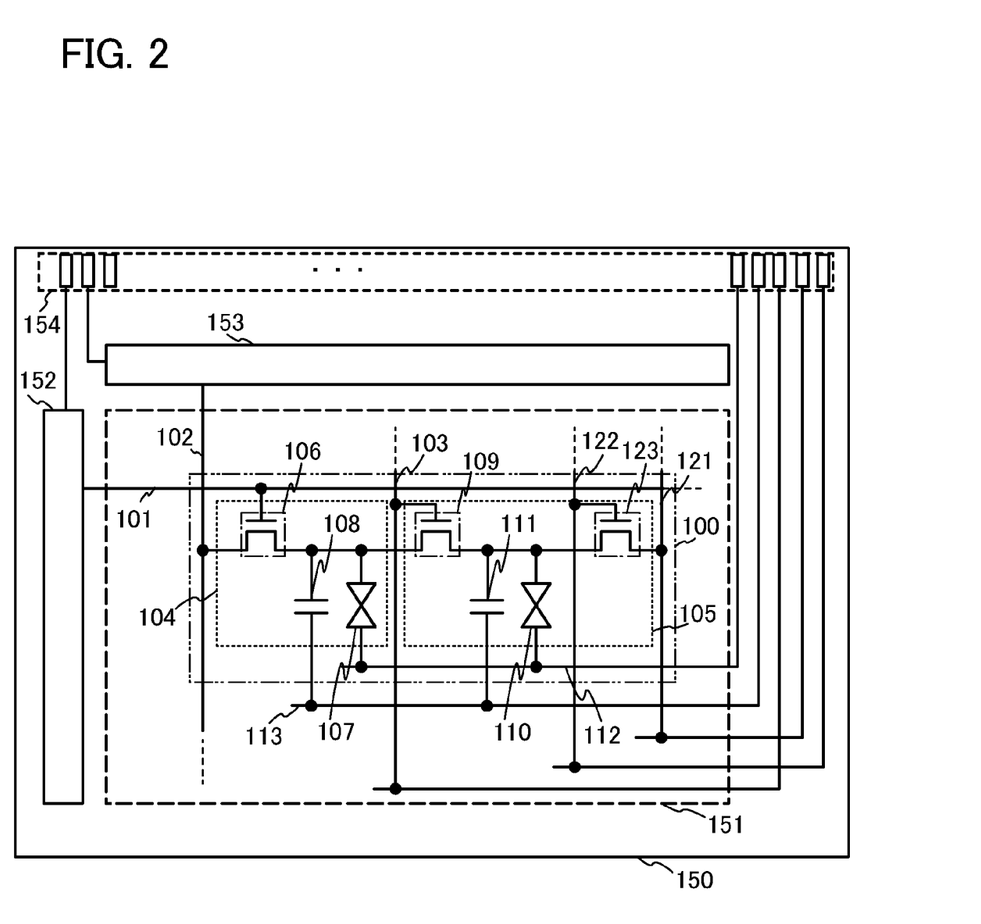
FIG. 2 is a diagram illustrating a liquid crystal display device of an embodiment of the present invention.

Next, FIG. 2 is a schematic view of a liquid crystal display device which includes the pixel 100 having the configuration illustrated in FIG. 1. In FIG. 2, a pixel portion 151, a scan line driver circuit 152 (also referred to as a gate line driver circuit), a signal line driver circuit 153 (also referred to as a data line driver circuit), and a terminal portion 154 are provided over a substrate 150.

Note that in FIG. 2, the scan line 101 is driven so that on/off of the first pixel transistor 106 is controlled by the scan line driver circuit 152. An image signal to be supplied to the first liquid crystal element 107 or the second liquid crystal element 110 is supplied to the first signal line 102 from the signal line driver circuit 153. An image signal to be supplied to the second liquid crystal element 110 is supplied to the second signal line 121 from the terminal portion 154. A first selection signal that controls on/off of the second pixel transistor 109 is supplied to the first selection line 103 from the terminal portion 154. A second selection signal that controls on/off of the third pixel transistor 123 is supplied to the second selection line 122 from the terminal portion 154. Note that the scan line 101 is perpendicular to the first selection line 103 and the second selection line 122 in FIG. 2, but may be provided in parallel to the first selection line 103 and the second selection line 122.

The scan line driver circuit 152 and the signal line driver circuit 153 are preferably provided over the substrate over which the pixel portion 151 is formed; however, these are not necessarily formed over the substrate over which the pixel portion 151 is formed. When the scan line driver circuit 152 and the signal line driver circuit 153 are provided over the substrate over which the pixel portion 151 is formed, the number of the connection terminals for connection to the outside and the size of the liquid crystal display device can be reduced.

Note that the plurality of pixels 100 is provided (arranged) in a matrix form in the pixel portion 151. Here, description that pixels are provided (arranged) in a matrix form includes the case where the pixels are provided in a straight line and the case where the pixels are provided in a jagged line, in a longitudinal direction or a lateral direction.

In addition to the first selection signal supplied to the first selection line 103, signals for controlling the scan line driver circuit 152 and the signal line driver circuit 153 (a high power supply potential $V_{dd}$, a low power supply potential $V_{ss}$, a start pulse SP, and a clock signal CK, which are hereinafter referred to as driver circuit control signals), fixed potentials supplied to the common potential line 112 and the capacitor line 113, the image signal supplied to the second signal line 121, the second selection signal supplied to the second selection line 122, and the like are supplied from the terminal portion 154. Note that the scan line driver circuit 152 and the signal line driver circuit 153 to which the driver circuit control signals are supplied may each include a shift register circuit in which flip-flop circuits or the like are cascaded. As for the first selection signal supplied to the first selection line 103 and the second selection signal supplied to the second selection line 122, the same signals may be supplied all at once to the first selection line 103 and the second selection line 122 which are connected to each pixel, which is different from the case of a scan line or a signal line through which signals are sequentially supplied to a plurality of wirings. Note that the image signal supplied to the second signal line 121 is an image signal for display at a black grayscale level in the reflective pixel portion 105; thus, the image signal having a potential for display at a black grayscale level may be supplied to the second liquid crystal element 110 via the third pixel transistor 123, which is different from the case of image signals supplied to the scan line and the first signal line 102 through which the image signals are sequentially supplied to a plurality of wirings.

Next, operation of the liquid crystal display device will be described with reference to FIG. 3, FIGS. 4A and 4B, FIGS. 5A to 5E, and FIG. 6, in addition to FIG. 2.

Figure 3:
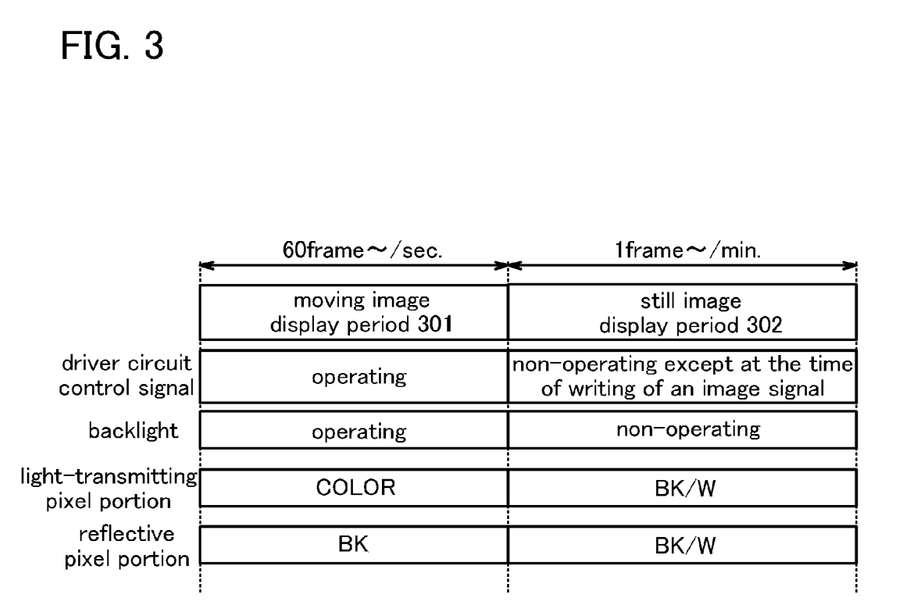
FIG. 3 is a chart showing operation of a liquid crystal display device of an embodiment of the present invention.

As shown in FIG. 3, the operation of the liquid crystal display device is roughly divided into a moving image display period 301 and a still image display period 302. Note that the moving image display period 301 and the still image display period 302 may be switched by supplying a signal for switching the periods from the outside or by judging the moving image display period 301 or the still image display period 302 on the basis of an image signal.

The cycle of one frame period (or frame frequency) is preferably less than or equal to 1/60 sec (higher than or equal to 60 Hz) in the moving image display period 301. The frame frequency is increased, so that flickering is not sensed by a viewer of an image. In the still image display period 302, the cycle of one frame period is extremely long, for example, longer than or equal to one minute (lower than or equal to 0.017 Hz), so that eyestrain can be alleviated as compared to the case where the same image is switched plural times.

When an oxide semiconductor is used for semiconductor layers of the first pixel transistor 106, the second pixel transistor 109, and the third pixel transistor 123, carriers in the oxide semiconductor can be extremely few as described above and thus the off-state current can be reduced. Accordingly, an electrical signal such as the image signal can be held for a longer time in the pixel, and a writing interval can be set longer. Therefore, the cycle of one frame period can be set longer, and the frequency of refresh operation in the still image display period 302 can be reduced, whereby an effect of suppressing power consumption can be further increased.

In the moving image display period 301 in FIG. 3, a color moving image can be displayed by field sequential driving, for example. Note that color display may be performed using a color filter. In order to display a moving image by field sequential driving, the driver circuit control signals are supplied to the scan line driver circuit 152 and the signal line driver circuit 153. In the moving image display period 301 in FIG. 3, a backlight used for the color display by field sequential driving is operated. Thus, a color moving image can be displayed on a display panel.

In the moving image display period 301, an image signal is supplied from the signal line driver circuit 153 through the first signal line 102 so that color display (denoted by COLOR in the drawing) is performed in the light-transmitting pixel portion 104, and an image signal is supplied from the terminal portion 154 through the second signal line 121 so that display at a black grayscale level (denoted by BK in the drawing) is performed in the reflective pixel portion 105. Thus, the contrast in the light-transmitting pixel portion 104, which is reduced by light scattering caused by irradiation of outside light on the reflective pixel portion 105, can be recovered.

In the still image display period 302 in FIG. 3, an image signal is supplied through the first signal line 102 so that a black-and-white grayscale (denoted by BK/W in the drawing) is displayed depending on whether reflected light is transmitted or not, whereby a still image can be displayed. In the still image display period 302, the driver circuit control signals are supplied only when the black-and-white grayscale image signals are written, and supply of the driver circuit control signals is partly or completely stopped in a period in which the image signal which has been written is held, that is, in a period except the period in which the black-and-white grayscale image signal is written. Therefore, power consumption can be reduced in the still image display period 302 owing to the period in which the supply of the driver circuit control signals is stopped. Moreover, display comes to be visible by utilizing reflected light of outside light in the still image display period 302 in FIG. 3; therefore, the backlight is not operated. Thus, a black-and-white grayscale still image can be displayed on the display panel.

As for the stop of the supply of the driver circuit control signals, in the case where the holding period of the image signal which has been written is short, a configuration in which supply of the high power supply potential $V_{dd}$ and the low power supply potential $V_{ss}$ is not stopped may be originally employed. This is because increase in power consumption due to repetition of stop and start of supply of the high power supply potential $V_{dd}$ and the low power supply potential $V_{ss}$ can be reduced, which is favorable.

Next, the moving image display period 301 and the still image display period 302 of FIG. 3 will be described in detail with reference to timing charts of FIGS. 4A and 4B, respectively. The timing charts of FIGS. 4A and 4B are exaggerated for description.

First, FIG. 4A will be described. FIG. 4A shows the driver circuit control signals supplied to the scan line driver circuit 152 and the signal line driver circuit 153, image signals, and the state of the backlights in one frame period of the moving image display period 301, as an example. As for the backlights, the case where lights emitting three colors of red (R), green (G), and blue (B) are sequentially turned on is described. By using LEDs as the backlights, lower power consumption and longer lifetime can be achieved.

In the moving image display period 301, a moving image is displayed by field sequential driving; therefore, operation in the light-transmitting pixel portion 104 is performed in such a manner that an image signal for red (R) display is written into each pixel through the first signal line 102 first, a backlight of R is then turned on, an image signal for green (G) display is written into each pixel through the first signal line 102 next, a backlight of G is then turned on, an image signal for blue (B) display is written into each pixel through the first signal line 102 next, and a backlight of B is then turned on. Next, in the moving image display period 301, after the image signals of R, G, and B are written and the backlights of R, G, and B are turned on, operation is performed so that an image signal for display at a black grayscale level is supplied to the reflective pixel portion 105 through the second signal line 121. Further, in the moving image display period 301, the driver circuit control signals are supplied to driver circuits, so that both the scan line driver circuit 152 and the signal line driver circuit 153 are operated.

Figure 4A:
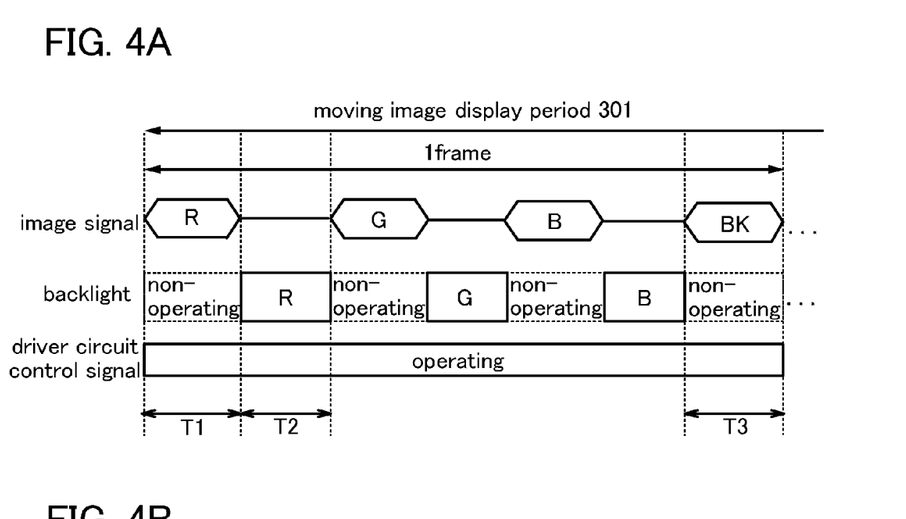
FIGS. 4A and 4B are charts showing operation of a liquid crystal display device of an embodiment of the present invention.
Figure 4B:
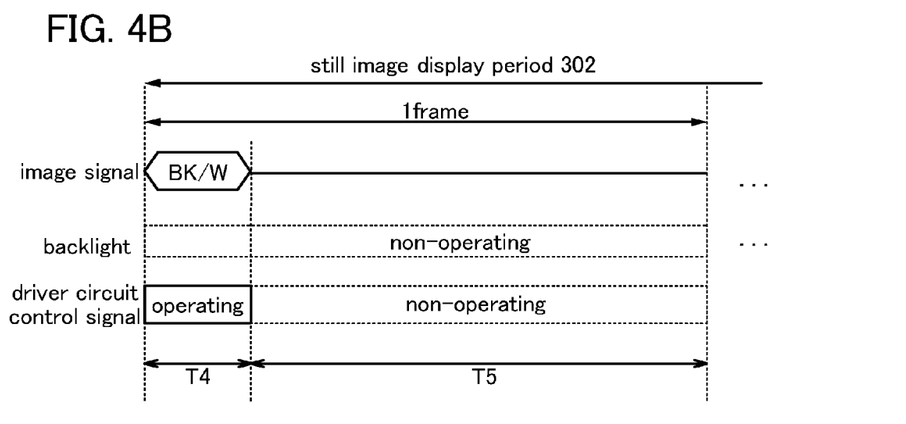

In short, the moving image display period 301 can be roughly divided into an image signal writing period (T1 in FIG. 4A, which is also referred to as a first period), a backlight lighting period (T2 in FIG. 4A, which is also referred to as a second period), and a black grayscale signal writing period (T3 in FIG. 4A, which is also referred to as a third period).

By repeating the above operation so that image signals are changed, a viewer can perceive color display of a moving image. Note that the order of R, G, and B in FIG. 4A may be a different order or display may be performed using more colors. The black grayscale signal writing period, which is the third period T3, is provided once in one frame period in FIG. 4A, but may be provided once in a plurality of frame periods.

Note that the supply of the image signal for display at a black grayscale level to the reflective pixel portion 105 may be performed before the image signal writing period and the backlight lighting period. Thus, the contrast in the light-transmitting pixel portion 104, which is reduced by light scattering caused by irradiation of outside light on the reflective pixel portion 105, can be recovered.

Next, FIG. 4B will be described. Similarly to FIG. 4A, FIG. 4B shows the driver circuit control signals supplied to the scan line driver circuit 152 and the signal line driver circuit 153, an image signal, and the state of the backlights in one frame period of the still image display period 302.

In the still image display period 302, an image signal for displaying a black-and-white grayscale image depending on whether reflected light is transmitted or not is supplied through the first signal line 102. At this time, the backlights are not operated, and the driver circuit control signals are supplied to driver circuits, so that both the scan line driver circuit 152 and the signal line driver circuit 153 are operated. Next, the image signal for displaying a black-and-white grayscale image which has been written is held, so that a still image is displayed. At this time, an additional image signal is not written, the backlights are not operated, and the driver circuit control signals are not supplied. Therefore, power consumed by the backlights and the driver circuit control signals can be reduced; thus, lower power consumption can be achieved. As for the holding of the still image, the image signal written into a pixel is held by a pixel transistor whose off-state current is extremely small; therefore, the black-and-white grayscale still image can be held for longer than or equal to one minute. In addition, the still image may be held in the following manner: before the level of the image signal held is lowered after a certain period of time, a new still image signal which is the same image signal as the still image signal of the previous period is written (refresh operation) and the still image is held again.

The still image display period 302 can be roughly divided into a still image signal writing period (T4 in FIG. 4B, which is also referred to as a fourth period) and a still image signal holding period (T5 in FIG. 4B, which is also referred to as a fifth period).

Next, how the pixel 100 in FIG. 1 is operated in the periods T1 to T5 in FIGS. 4A and 4B will be described with reference to FIGS. 5A to 5E which illustrate signals and on/off of pixel transistors. Although not all components are denoted by reference numerals in FIGS. 5A to 5E, description is given using the same reference numerals as FIG. 1. Further, dotted arrows in FIGS. 5A to 5E are shown to facilitate understanding of signal flow. "ON" and "OFF" in FIGS. 5A to 5E represent on and off of the pixel transistors, respectively. "COLOR" in FIGS. 5A to 5E is shown to facilitate understanding of the state where a color image signal (a first image signal) is supplied to or held in the signal line, the light-transmitting pixel portion, or the reflective pixel portion. Similarly, "BK" represents a black grayscale image signal (an image signal for black display), and "BK/W" represents a black-and-white image signal (a second image signal).

Figure 5A:
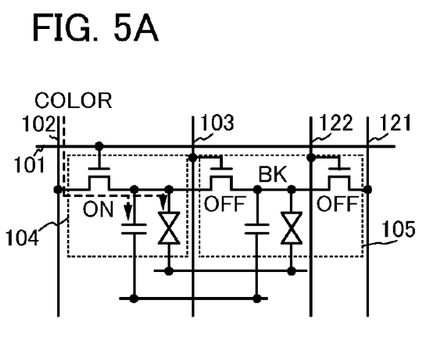
FIGS. 5A to 5E are diagrams illustrating a liquid crystal display device of an embodiment of the present invention.

First, in the period T1 illustrated in FIG. 5A, that is, in the image signal writing period, the scan line 101 is controlled so that the first pixel transistor 106 is turned on, the first image signal (denoted by COLOR in the drawing) is supplied to the first signal line 102, and the first image signal is written into the first liquid crystal element 107 in the light-transmitting pixel portion 104; thus, the alignment of liquid crystal in the light-transmitting pixel portion 104 is controlled. At this time, in the reflective pixel portion 105, the first selection line 103 is controlled so that the second pixel transistor 109 is turned off, the second selection line 122 is controlled so that the third pixel transistor 123 is turned off, the first image signal of the first signal line 102 and the black grayscale image signal of the second signal line 121 are not written into the second liquid crystal element 110, and a black grayscale image signal (denoted by BK in the drawing) which has been written in the previous frame period is held; thus, the second liquid crystal element 110 in the reflective pixel portion 105 is controlled.

Figure 6:
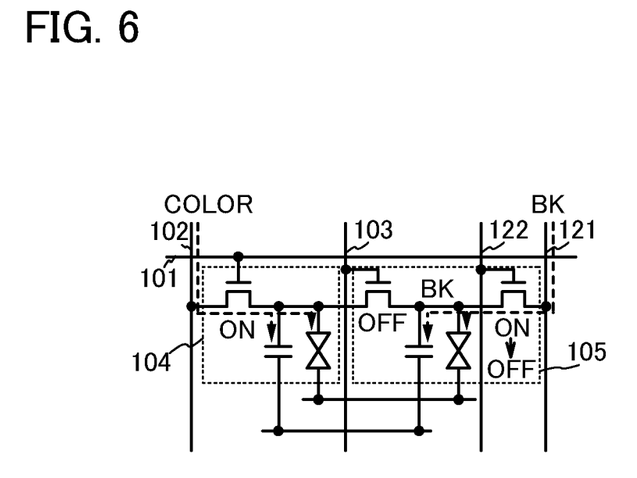
FIG. 6 is a diagram illustrating a liquid crystal display device of an embodiment of the present invention.

Note that in the image signal writing period, a configuration may be employed in which the scan line 101 is controlled so that the first pixel transistor 106 is turned on, the first image signal is supplied to the first signal line 102 to be written into the first liquid crystal element 107, the second selection line 122 is controlled so that the third pixel transistor 123 is turned on, and the black grayscale image signal of the second signal line 121 is written into the second liquid crystal element 110. This operation is illustrated in FIG. 6. The on/off of the third pixel transistor 123 is controlled by the second selection line 122, whereby the black grayscale image signal can be supplied through the second signal line 121 separately from the first signal line 102. Accordingly, the black grayscale signal writing period described later can be omitted and thus one frame period can be shortened. After the black grayscale image signal is written into the second liquid crystal element 110, the third pixel transistor 123 may be turned off.

Note that the writing of the signal for black display into the second liquid crystal element 110 in FIG. 6 may be performed all at once in all the pixels. The writing of the signal for black display into the second liquid crystal element 110 can be performed separately from the first signal line 102, and thus can be performed at any time. Note that it is preferable that the black grayscale image signal be written into the second liquid crystal element 110 in advance in the backlight lighting period. This is for prevention of reduction in contrast.

Figure 5B:
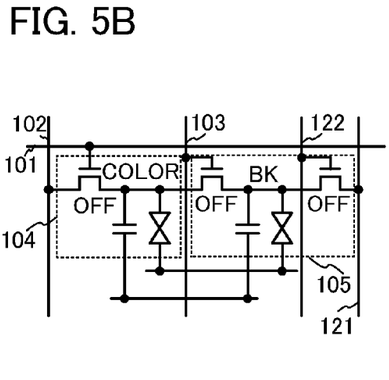

Then, in the period T2 illustrated in FIG. 5B, that is, in the backlight lighting period, the scan line 101 is controlled so that the first pixel transistor 106 is turned off, and light from the backlight is transmitted or not transmitted depending on the alignment of liquid crystal corresponding to the first image signal (denoted by COLOR in the drawing) which has been written in the image signal writing period in the light-transmitting pixel portion 104. At this time, in the reflective pixel portion 105, the first selection line 103 is controlled so that the second pixel transistor 109 is turned off, the second selection line 122 is controlled so that the third pixel transistor 123 is turned off, and the black grayscale image signal (denoted by BK in the drawing) which has been written in the previous frame period is held; thus, the second liquid crystal element 110 in the reflective pixel portion 105 is controlled.

Figure 5C:
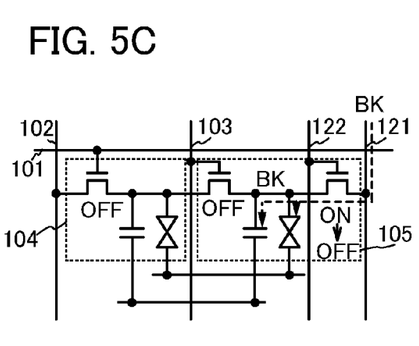

Next, in the period T3 illustrated in FIG. 5C, that is, in the black grayscale signal writing period, the scan line 101 is controlled so that the first pixel transistor 106 is turned off and an image signal is not written into the first liquid crystal element 107 in the light-transmitting pixel portion 104. At this time, in the reflective pixel portion 105, the first selection line 103 is controlled so that the second pixel transistor 109 is turned off, the second selection line 122 is controlled so that the third pixel transistor 123 is turned on, and the black grayscale image signal of the second signal line 121 is written into the second liquid crystal element 110; thus, the second liquid crystal element 110 in the reflective pixel portion 105 is controlled. Note that after the black grayscale image signal is written into the second liquid crystal element 110, the third pixel transistor 123 may be turned off.

Note that the writing of the signal for black display into the second liquid crystal element 110 in the period T3 may be performed all at once in all the pixels. By writing the signal for black display all at once or by writing the signal for black display by line sequential driving, the period T3 can be shortened and the image quality can be improved.

Figure 5D:
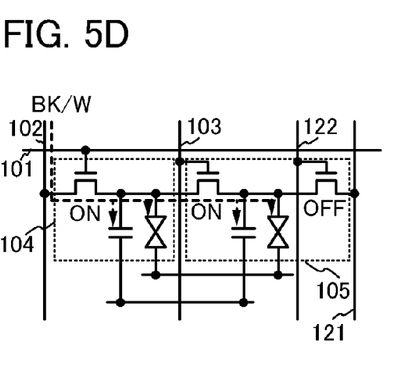

Next, in the period T4 illustrated in FIG. 5D, that is, in the still image signal writing period, the scan line 101 is controlled so that the first pixel transistor 106 is turned on, the second image signal (denoted by BK/W in the drawing) is supplied to the first signal line 102, and the signal for black-and-white display is written into the first liquid crystal element 107 in the light-transmitting pixel portion 104; thus, the alignment of liquid crystal in the light-transmitting pixel portion 104 is controlled. At this time, in the reflective pixel portion 105, the first selection line 103 is controlled so that the second pixel transistor 109 is turned on, the second selection line 122 is controlled so that the third pixel transistor 123 is turned off, and the second image signal of the first signal line 102 is written into the second liquid crystal element 110; thus, the second liquid crystal element 110 in the reflective pixel portion 105 is controlled.

Figure 5E:
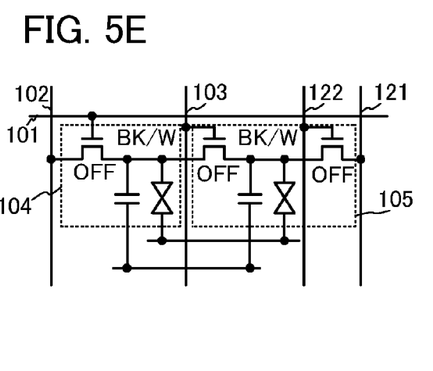

Then, in the period T5 illustrated in FIG. 5E, that is, in the still image signal holding period, the scan line 101 is controlled so that the first pixel transistor 106 is turned off and the alignment of liquid crystal is controlled in response to the second image signal (denoted by BK/W in the drawing) which has been written in the still image signal writing period in the light-transmitting pixel portion 104. At this time, in the reflective pixel portion 105, the first selection line 103 is controlled so that the second pixel transistor 109 is turned off, the second selection line 122 is controlled so that the third pixel transistor 123 is turned off, and the second image signal (denoted by BK/W in the drawing) which has been written in the still image signal writing period is held; thus, the second liquid crystal element 110 in the reflective pixel portion 105 is controlled.

Note that in the still image signal writing period illustrated in FIG. 5D, the second image signal is written into the reflective pixel portion 105 and the second image signal is also written into the light-transmitting pixel portion 104. Although the backlight is not operated in the still image signal holding period illustrated in FIG. 5E, an image might be dark and difficult to see owing to insufficient reflection of light in the reflective pixel portion 105, depending on the environment or the like. In such a case, the visibility can be secured by operating the backlight and switching display of the reflective pixel portion 105 to the display of the light-transmitting pixel portion 104 into which the second image signal at the same grayscale level has been written. The switching of an operating state and a non-operating state of the backlight may be performed only when the visibility is insufficient; therefore, an optical sensor or the like may be additionally provided and the switching may be performed in accordance with the illuminance of the environment. Note that the operating state and the non-operating state of the backlight may be switched by manual operation with a switch or the like. Further, by using an oxide semiconductor for the first pixel transistor 106, the second pixel transistor 109, and the third pixel transistor 123, the off-state current thereof can be reduced. Reduction in off-state current leads to a long still image signal holding period; therefore, the use of an oxide semiconductor is preferable for reduction in power consumption.

In the still image signal holding period, the frequency of operation such as writing of an image signal can be reduced. When seeing an image formed by writing image signals a plurality of times, the human eyes recognize images switched a plurality of times, which might lead to eyestrain. With a structure in which the frequency of writing of image signals is reduced as described in this embodiment, eyestrain can be alleviated.

In the above-described manner, according to an embodiment of the present invention, reduction in contrast due to light scattering or the like in a reflective pixel portion can be suppressed and power consumption can be reduced without making the structure complicated, for example, increase in the number of driver circuits, wirings, and the like.

This embodiment can be implemented in combination with any of the structures described in the other embodiments as appropriate.

Embodiment 2

In this embodiment, structures of a top view and a cross-sectional view corresponding to the circuit diagram of the pixel of the liquid crystal display device illustrated in FIG. 1 of Embodiment 1 will be described.

Figure 7A:
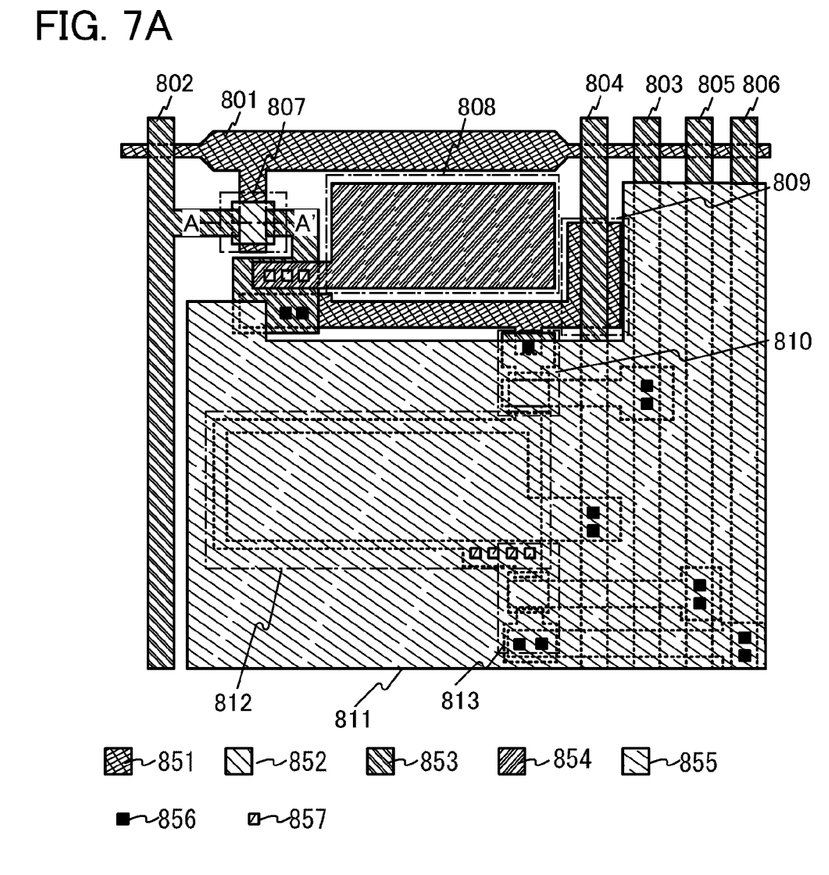
FIGS. 7A and 7B are diagrams illustrating a liquid crystal display device of an embodiment of the present invention.
Figure 7B:
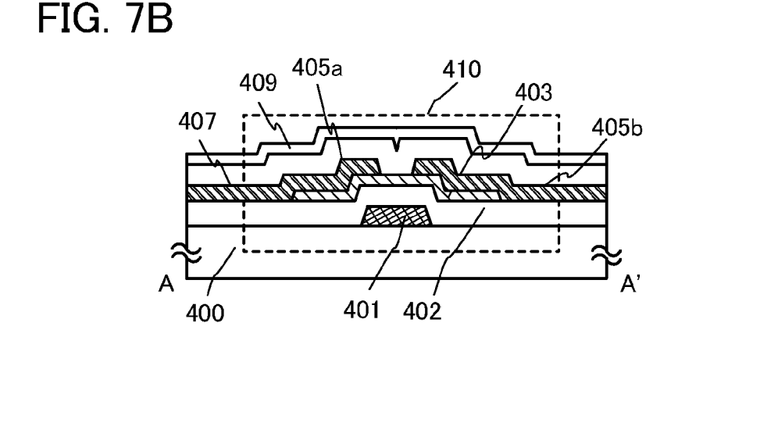

FIGS. 7A and 7B are a top view and a cross-sectional view, respectively, in the case where inverted staggered transistors are used as the first pixel transistor 106, the second pixel transistor 109, and the third pixel transistor 123 described in Embodiment 1. The cross-sectional view of a pixel transistor illustrated in FIG. 7B corresponds to a cross section along line A-A' in the top view of the pixel illustrated in FIG. 7A.

First, an example of a layout of a pixel of a liquid crystal display device will be described with reference to FIG. 7A. Note that FIGS. 7A and 7B illustrate a structure applied to the pixel 100 in FIG. 1 described in Embodiment 1.

The pixel in FIG. 7A that can be applied to the liquid crystal display device of Embodiment 1 includes a scan line 801, a first signal line 802, a first selection line 803, a capacitor line 804, a second selection line 805, a second signal line 806, a first pixel transistor 807, a first pixel electrode 808, a first capacitor 809, a second pixel transistor 810, a second pixel electrode 811, a second capacitor 812, and a third pixel transistor 813 as components corresponding to those in FIG. 1. The components are formed using a conductive layer 851, a semiconductor layer 852, a conductive layer 853, a transparent conductive layer 854, a reflective conductive layer 855, a contact hole 856, and a contact hole 857.

The conductive layer 851 has a region that functions as a gate electrode or a scan line. The semiconductor layer 852 has regions that function as semiconductor layers of the pixel transistors. The conductive layer 853 has regions that function as a wiring and sources and drains of the pixel transistors. The transparent conductive layer 854 has a region that functions as a pixel electrode of a first liquid crystal element. The reflective conductive layer 855 has a region that functions as a pixel electrode of a second liquid crystal element. The conductive layer 851 and the conductive layer 853 are connected to each other through the contact hole 856. The conductive layer 853 and the conductive layer 854 or the conductive layer 853 and the conductive layer 855 are connected to each other through the contact hole 857.

Figure 8:
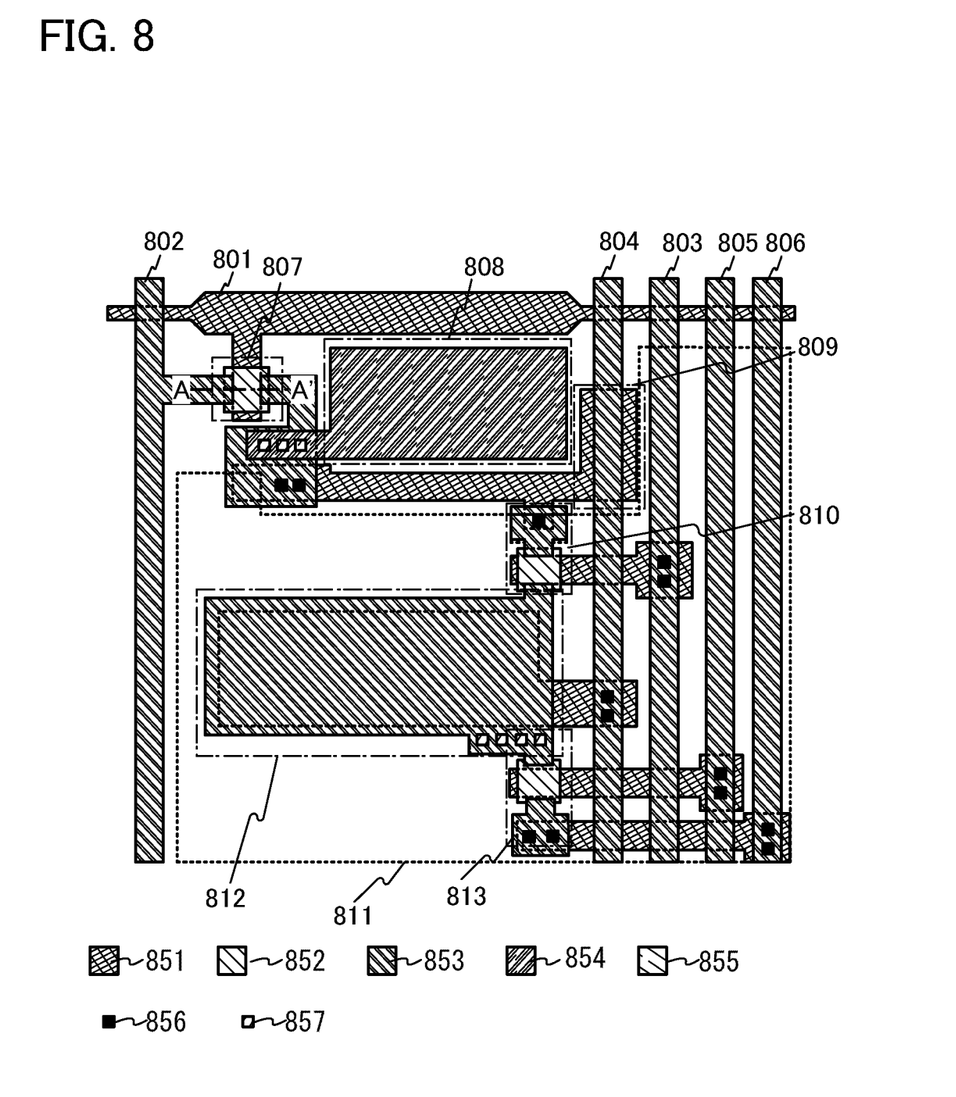
FIG. 8 is a diagram illustrating a liquid crystal display device of an embodiment of the present invention.

Note that FIG. 8 illustrates a layout of a pixel in which the reflective conductive layer 855 is not shown. As illustrated in FIG. 8, the second pixel transistor 810 and the second capacitor 812 are provided to overlap with the reflective conductive layer 855. The second capacitor 812 is provided in a position overlapping with the reflective conductive layer 855; thus, the capacitance can be increased without reduction in the aperture ratio.

In order to reflect incident outside light irregularly, the reflective conductive layer 855 is preferably subjected to treatment for making a surface thereof uneven.

In the layouts of the pixels in FIG. 7A and FIG. 8, the first pixel electrode 808 and the first signal line 802 are provided to be apart from each other. By providing the first pixel electrode 808 and the first signal line 802 to be apart from each other, variation in the potential of the first pixel electrode 808 due to variation in the potential of the signal line can be reduced.

In the layouts of the pixels in FIG. 7A and FIG. 8, the conductive layer 851 is preferably provided so as to surround the first pixel electrode 808. With the structure in which the first pixel electrode 808 is surrounded by the conductive layer 851, a light-blocking portion (black matrix) which is provided so as to surround the first pixel electrode 808 can be omitted. Moreover, it is preferable that the conductive layer 851 be provided between the transparent conductive layer 854 and the reflective conductive layer 855 because a difference in height between surfaces of the transparent conductive layer 854 and the reflective conductive layer 855 can be reduced.

In the layouts of the pixels in FIG. 7A and FIG. 8, the first selection line 803 and the capacitor line 804 are provided in parallel to the first signal line 802. By providing the first selection line 803, the capacitor line 804, and the first signal line 802 in parallel to one another, the capacitance in an intersection between the wirings can be reduced. Accordingly, noise, delay of a signal, distortion of a signal waveform, or the like can be reduced.

Next, the structure of the cross-sectional view of FIG. 7B will be described. In this embodiment, a method for forming a transistor particularly when a semiconductor layer is formed using an oxide semiconductor will be described. FIG. 7B illustrates a transistor including an oxide semiconductor as a semiconductor layer. An advantage of using an oxide semiconductor is that high mobility and low off-state current can be obtained in relatively easy and low-temperature processes; needless to say, another semiconductor may be used.

A transistor 410 illustrated in FIG. 7B is a kind of bottom-gate transistors, and is also referred to as an inverted staggered transistor. Note that there is no particular limitation on a structure of a transistor which can be applied to a liquid crystal display device disclosed in this specification. For example, a top-gate staggered structure, a bottom-gate staggered structure, a top-gate planar structure, a bottom-gate planar structure, or the like can be used. The transistor may have a single-gate structure in which one channel formation region is formed, a double-gate structure in which two channel formation regions are formed, or a triple-gate structure in which three channel formation regions are formed. Alternatively, the transistor may have a dual-gate structure including two gate electrode layers positioned above and below a channel region with gate insulating layers provided therebetween.

The transistor 410 includes, over a substrate 400 having an insulating surface, a gate electrode layer 401, a gate insulating layer 402, an oxide semiconductor layer 403, a source electrode layer 405a, and a drain electrode layer 405b. In addition, an insulating layer 407 which covers the transistor 410 and is stacked over the oxide semiconductor layer 403 is provided. A protective insulating layer 409 is formed over the insulating layer 407.

In this embodiment, as described above, the oxide semiconductor layer 403 is used as a semiconductor layer. As an oxide semiconductor used for the oxide semiconductor layer 403, an In—Sn—Ga—Zn—O-based metal oxide which is a four-component metal oxide; an In—Ga—Zn—O-based metal oxide, an In—Sn—Zn—O-based metal oxide, an In—Al—Zn—O-based metal oxide, a Sn—Ga—Zn—O-based metal oxide, an Al—Ga—Zn—O-based metal oxide, or a Sn—Al—Zn—O-based metal oxide which is a three-component metal oxide; an In—Zn—O-based metal oxide, a Sn—Zn—O-based metal oxide, an Al—Zn—O-based metal oxide, a Zn—Mg—O-based metal oxide, a Sn—Mg—O-based metal oxide, or an In—Mg—O-based metal oxide which is a two-component metal oxide; an In—O-based metal oxide, a Sn—O-based metal oxide, a Zn—O-based metal oxide, or the like can be used. Further, $SiO_2$ may be included in a semiconductor of the above metal oxide. Here, for example, an In—Ga—Zn—O-based metal oxide is an oxide including at least In, Ga, and Zn, and there is no particular limitation on the composition ratio thereof. Further, the In—Ga—Zn—O-based metal oxide may include an element other than In, Ga, and Zn.

For the oxide semiconductor layer 403, a thin film represented by the chemical formula, $InMO_3(ZnO)_m$, (m>0) can be used. Here, M represents one or more metal elements selected from Ga, Al, Mn, and Co. For example, M can be Ga, Ga and Al, Ga and Mn, Ga and Co, or the like.

In the transistor 410 including the oxide semiconductor layer 403, a current value in an off state (off-state current value) can be reduced. Therefore, an electrical signal of image data or the like can be held for a longer time, so that a writing interval can be set longer. Accordingly, the frequency of refresh operation can be reduced, which leads to an effect of suppressing power consumption.

Although there is no particular limitation on a substrate that can be used as the substrate 400 having an insulating surface, a glass substrate of barium borosilicate glass, aluminoborosilicate glass, or the like is used.

In the bottom-gate transistor 410, an insulating layer serving as a base film may be provided between the substrate and the gate electrode layer. The base film has a function of preventing diffusion of an impurity element from the substrate, and can be formed to have a single-layer structure or a stacked-layer structure using one or more layers selected from a silicon nitride layer, a silicon oxide layer, a silicon nitride oxide layer, and a silicon oxynitride layer.

The gate electrode layer 401 can be formed to have a single-layer structure or a stacked-layer structure using a metal material such as molybdenum (Mo), titanium (Ti), chromium (Cr), tantalum (Ta), tungsten (W), aluminum (Al), copper (Cu), neodymium (Nd), or scandium (Sc), or an alloy material including any of these as a main component.

The gate insulating layer 402 can be formed to have a single-layer structure or a stacked-layer structure using any of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, and a hafnium oxide layer by a plasma CVD method, a sputtering method, or the like. For example, a silicon nitride layer ($SiN_y$ (y>0)) with a thickness of greater than or equal to 50 nm and less than or equal to 200 nm is formed by a plasma CVD method as a first gate insulating layer, and a silicon oxide layer ($SiO_x$ (x>0)) with a thickness of greater than or equal to 5 nm and less than or equal to 300 nm is formed as a second gate insulating layer over the first gate insulating layer, so that a gate insulating layer with a thickness of 200 nm in total is formed.

A conductive film used for the source electrode layer 405a and the drain electrode layer 405b can be formed using an element selected from Al, Cr, Cu, Ta, Ti, Mo, and W, an alloy including any of these elements as a component, an alloy film including a combination of any of these elements, or the like. Alternatively, a structure may be employed in which a high-melting-point metal layer of Ti, Mo, W, or the like is stacked on one or both of a top surface and a bottom surface of a metal layer of Al, Cu, or the like. In addition, heat resistance can be improved by using an Al material to which an element (such as Si, Nd, or Sc) which prevents generation of a hillock or a whisker in an Al film is added.

Alternatively, the conductive film to be the source electrode layer 405a and the drain electrode layer 405b (including a wiring layer formed using the same layer as the source electrode layer 405a and the drain electrode layer 405b) may be formed using a conductive metal oxide. As the conductive metal oxide, indium oxide ($In_2O_3$), tin oxide ($SnO_2$), zinc oxide (ZnO), an indium oxide-tin oxide alloy ($In_2O_3$—$SnO_2$, which is abbreviated to ITO), an indium oxide-zinc oxide alloy (In$_2$O$_3$—ZnO), or any of these metal oxide materials including silicon oxide can be used.

As the insulating layer 407, typically, an inorganic insulating film such as a silicon oxide film, a silicon oxynitride film, an aluminum oxide film, or an aluminum oxynitride film can be used.

As the protective insulating layer 409, an inorganic insulating film such as a silicon nitride film, an aluminum nitride film, a silicon nitride oxide film, or an aluminum nitride oxide film can be used.

In addition, a planarization insulating film may be formed over the protective insulating layer 409 in order to reduce surface unevenness due to the transistor. As the planarization insulating film, an organic material such as polyimide, acrylic, or benzocyclobutene can be used. Other than such organic materials, it is also possible to use a low-dielectric constant material (a low-k material) or the like. Note that the planarization insulating film may be formed by stacking a plurality of insulating films formed using any of these materials. Note that a needed component such as a reflective conductive layer or a liquid crystal layer may be provided as appropriate over the protective insulating layer 409.

This embodiment can be implemented in combination with any of the other embodiments as appropriate.

Embodiment 3

In this embodiment, an example of an electronic device including the liquid crystal display device described in any of the above embodiments will be described.

Figure 9A:
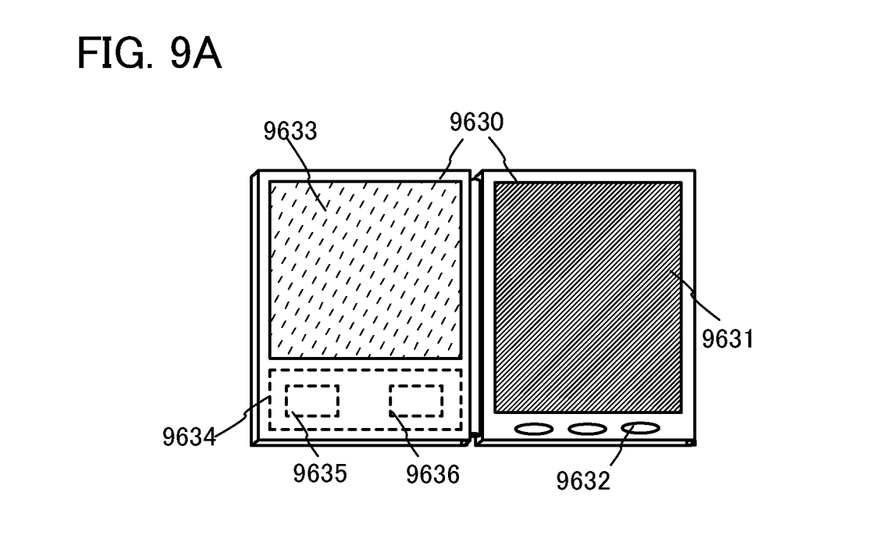
FIGS. 9A and 9B are diagrams illustrating an electronic device of an embodiment of the present invention.

FIG. 9A illustrates an electronic book reader (also referred to as an e-book reader) which can include housings 9630, a display portion 9631, operation keys 9632, a solar cell 9633, and a charge and discharge control circuit 9634. The electronic book reader illustrated in FIG. 9A can have a function of displaying various kinds of information (such as a still image, a moving image, and a text image), a function of displaying a calendar, a date, time, or the like on the display portion, a function of operating or editing the information displayed on the display portion, a function of controlling processing by various kinds of software (programs), and the like. Note that in FIG. 9A, a battery 9635 and a DCDC converter 9636 (hereinafter abbreviated to a converter) are included in the charge and discharge control circuit 9634, as an example.

When a semi-transmissive liquid crystal display device is used as the display portion 9631, the electronic book reader is expected to be used in a relatively bright environment, in which case the structure illustrated in FIG. 9A is preferable because power generation by the solar cell 9633 and charge in the battery 9635 can be efficiently performed. Note that the solar cell 9633 can be configured so that the battery 9635 is charged on a front surface and a rear surface of the housing 9630, which is preferable. When a lithium ion battery is used as the battery 9635, there is an advantage of downsizing or the like.

Figure 9B:
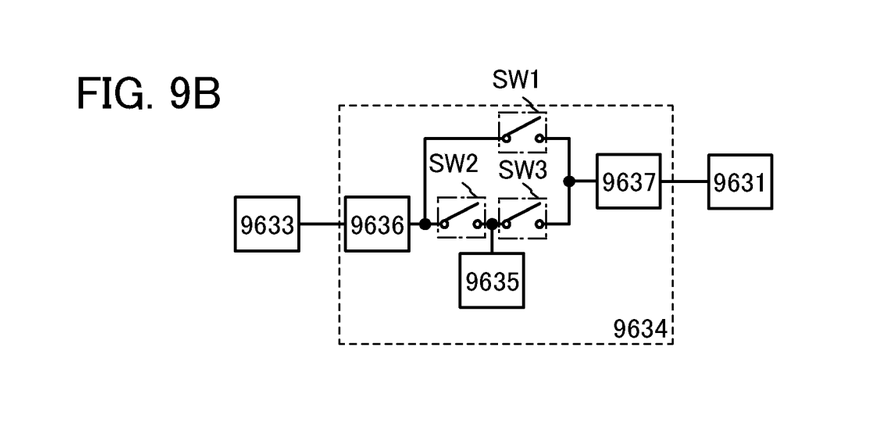

The structure and the operation of the charge and discharge control circuit 9634 illustrated in FIG. 9A will be described with reference to a block diagram in FIG. 9B. The solar cell 9633, the battery 9635, the converter 9636, a converter 9637, switches SW1 to SW3, and the display portion 9631 are illustrated in FIG. 9B, and the battery 9635, the converter 9636, the converter 9637, and the switches SW1 to SW3 correspond to the charge and discharge control circuit 9634.

First, an example of operation in the case where power is generated by the solar cell 9633 with the use of outside light is described. The voltage of power generated by the solar cell 9633 is raised or lowered by the converter 9636 so as to be voltage for charging the battery 9635. Then, when the power from the solar cell 9633 is used for the operation of the display portion 9631, the switch SW1 is turned on and the voltage of the power is raised or lowered by the converter 9637 to be voltage needed for the display portion 9631. In addition, when display on the display portion 9631 is not performed, the switch SW1 is turned off and the switch SW2 is turned on so that charge of the battery 9635 may be performed.

Next, an example of operation in the case where power is not generated by the solar cell 9633 with the use of outside light is described. The voltage of power accumulated in the battery 9635 is raised or lowered by the converter 9637 by turning on the switch SW3. Then, power from the battery 9635 is used for the operation of the display portion 9631.

Note that although the solar cell 9633 is described as an example of a means for charge, charge of the battery 9635 may be performed with another means. In addition, a combination of the solar cell 9633 and another means for charge may be used.

This embodiment can be implemented in combination with any of the structures described in the other embodiments as appropriate.

This application is based on Japanese Patent Application serial no. 2010-009681 filed with Japan Patent Office on Jan. 20, 2010, the entire contents of which are hereby incorporated by reference.

EXPLANATION OF REFERENCE

100: pixel, 101: scan line, 102: first signal line, 103: first selection line, 104: light-transmitting pixel portion, 105: reflective pixel portion, 106: first pixel transistor, 107: first liquid crystal element, 108: first capacitor, 109: second pixel transistor, 110: second liquid crystal element, 111: second capacitor, 112: common potential line, 113: capacitor line, 121: second signal line, 122: second selection line, 123: third pixel transistor, 150: substrate, 151: pixel portion, 152: scan line driver circuit, 153: signal line driver circuit, 154: terminal portion, 301: moving image display period, 302: still image display period, 400: substrate, 401: gate electrode layer, 402: gate insulating layer, 403: oxide semiconductor layer, 405a: source electrode layer, 405b: drain electrode layer, 407: insulating layer, 409: protective insulating layer, 410: transistor, 801: scan line, 802: first signal line, 803: first selection line, 804: capacitor line, 805: second selection line, 806: second signal line, 807: first pixel transistor, 808: first pixel electrode, 809: first capacitor, 810: second pixel transistor, 811: second pixel electrode, 812: second capacitor, 813: third pixel transistor, 851: conductive layer, 852: semiconductor layer, 853: conductive layer, 854: transparent conductive layer, 855: reflective conductive layer, 856: contact hole, 857: contact hole, 9630: housing, 9631: display portion, 9632: operation key, 9633: solar cell, 9634: charge and discharge control circuit, 9635: battery, 9636: converter, and 9637: converter.

The invention claimed is:

1. A liquid crystal display device comprising:
   a pixel having a light-transmitting pixel portion and a reflective pixel portion,
   the light-transmitting pixel portion comprising:
      a first pixel transistor whose first terminal is electrically connected to a first signal line and whose gate is electrically connected to a scan line; and
      a first liquid crystal element and a first capacitor which are electrically connected to a second terminal of the first pixel transistor, the reflective pixel portion comprising:
- a second pixel transistor whose first terminal is electrically connected to the second terminal of the first pixel transistor and whose gate is electrically connected to a first selection line;
- a second liquid crystal element and a second capacitor which are electrically connected to a second terminal of the second pixel transistor; and
- a third pixel transistor whose first terminal is electrically connected to a second signal line, whose gate is electrically connected to a second selection line, and whose second terminal is electrically connected to the second liquid crystal element and the second capacitor.

2. The liquid crystal display device, according to claim 1, further comprising:
an optical sensor which controls a backlight.

3. The liquid crystal display device, according to claim 1, wherein at least one of the first pixel transistor, the second pixel transistor, and the third pixel transistor includes an oxide semiconductor layer.

4. The liquid crystal display device, according to claim 1, wherein a carrier concentration of at least one of the first pixel transistor, the second pixel transistor, and the third pixel transistor is lower than $1 \times 10^{14}/cm^3$.

5. The liquid crystal display device, according to claim 1, wherein an off-state current of at least one of the first pixel transistor, the second pixel transistor, and the third pixel transistor is less than or equal to $1 \times 10^{-17}$ A/μm.

6. The liquid crystal display device, according to claim 1, wherein a part of the scan line and the first capacitor are provided so as to surround an electrode of the first liquid crystal element.

7. The liquid crystal display device, according to claim 1, wherein the second pixel transistor and the second capacitor are provided to overlap with an electrode of the second liquid crystal element.

8. The liquid crystal display device, according to claim 1,
wherein the first terminal of the third pixel transistor is directly connected to the second signal line, and
wherein the second terminal of the third pixel transistor is directly connected to the second liquid crystal element and the second capacitor.

9. The liquid crystal display device, according to claim 1,
wherein the first liquid crystal element and the first capacitor are directly connected to the second terminal of the first pixel transistor, and
wherein the first terminal of the second pixel transistor is directly connected to the second terminal of the first pixel transistor.

10. A method for driving a liquid crystal display device comprising a plurality of pixels,
wherein each of the pixels comprises a light-transmitting pixel portion and a reflective pixel portion,
wherein the light-transmitting pixel portion comprises a first pixel transistor whose first terminal is electrically connected to a first signal line and whose gate is electrically connected to a scan line, and a first liquid crystal element and a first capacitor which are electrically connected to a second terminal of the first pixel transistor, and
wherein the reflective pixel portion comprises a second pixel transistor whose first terminal is electrically connected to the second terminal of the first pixel transistor and whose gate is electrically connected to a first selection line, a second liquid crystal element and a second capacitor which are electrically connected to a second terminal of the second pixel transistor, and a third pixel transistor whose first terminal is electrically connected to a second signal line, whose gate is electrically connected to a second selection line, and whose second terminal is electrically connected to the second liquid crystal element and the second capacitor,
the method for driving the liquid crystal display device, comprising the steps of:
- in a first period, turning on the first pixel transistor, turning off the second pixel transistor, and supplying a first image signal to the first liquid crystal element and the first capacitor from the first signal line;
- in a second period, performing display in the light-transmitting pixel portion in response to the first image signal supplied in the first period;
- in a third period, turning on the third pixel transistor, and supplying a signal for black display to the second liquid crystal element and the second capacitor from the second signal line;
- repeating the first to third periods so that a moving image is displayed;
- in a fourth period, turning on the first pixel transistor, turning on the second pixel transistor, turning off the third pixel transistor, and supplying a second image signal to the first liquid crystal element, the first capacitor, the second liquid crystal element, and the second capacitor from the first signal line;
- in a fifth period, performing display in the reflective pixel portion in response to the second image signal supplied in the fourth period; and
- repeating the fourth and fifth periods so that a still image is displayed.

11. The method for driving a liquid crystal display device, according to claim 10,
wherein the first image signal is an image signal corresponding to any color of R, G, and B, and
wherein a backlight which emits the corresponding color of R, G, and B is sequentially operated in the second period.

12. The method for driving a liquid crystal display device, according to claim 10,
wherein the second image signal is an image signal for displaying an image at a lower grayscale level than an image of the first image signal.

13. The method for driving a liquid crystal display device, according to claim 10,
wherein time for displaying one image in the fourth and fifth periods is longer than time for displaying one image in the first to third periods.

14. The method for driving a liquid crystal display device, according to claim 10,
wherein supply of a driver circuit control signal for driving the scan line and the first signal line is stopped in the fifth period.

15. The method for driving a liquid crystal display device, according to claim 10, further comprising the step of:
switching between a first mode including the first to third periods and a second mode including the fourth and fifth periods.

16. The method for driving a liquid crystal display device, according to claim 10, further comprising the step of:
switching between a first mode including the first to third periods and a second mode including the fourth and fifth periods on the basis of the first or second image signal.

17. The method for driving a liquid crystal display device, according to claim 10, wherein a frame frequency is higher than or equal to 60 Hz in the first to third periods.

18. The method for driving a liquid crystal display device, according to claim 10,
wherein a frame frequency is lower than or equal to 0.017 Hz in the fourth and fifth periods.

19. The method for driving a liquid crystal display device, according to claim 10, further comprising the step of:
controlling a backlight by an optical sensor in the fifth period.

20. A method for driving a liquid crystal display device comprising a plurality of pixels,
wherein each of the pixels comprises a light-transmitting pixel portion and a reflective pixel portion,
wherein the light-transmitting pixel portion comprises a first pixel transistor whose first terminal is electrically connected to a first signal line and whose gate is electrically connected to a scan line, and a first liquid crystal element and a first capacitor which are electrically connected to a second terminal of the first pixel transistor, and
wherein the reflective pixel portion comprises a second pixel transistor whose first terminal is electrically connected to the second terminal of the first pixel transistor and whose gate is electrically connected to a first selection line, a second liquid crystal element and a second capacitor which are electrically connected to a second terminal of the second pixel transistor, and a third pixel transistor whose first terminal is electrically connected to a second signal line, whose gate is electrically connected to a second selection line, and whose second terminal is electrically connected to the second liquid crystal element and the second capacitor,
the method for driving the liquid crystal display device, comprising the steps of:
in a first period, turning on the first pixel transistor, turning off the second pixel transistor, turning off the third pixel transistor, and supplying a first image signal to the first liquid crystal element and the first capacitor from the first signal line;
in a second period, performing display in the light-transmitting pixel portion in response to the first image signal supplied in the first period;
in a third period, turning off the first pixel transistor, turning off the second pixel transistor, turning on the third pixel transistor, and supplying a signal for black display to the second liquid crystal element and the second capacitor from the second signal line in the reflective pixel portion;
repeating the first to third periods so that a moving image is displayed;
in a fourth period, turning on the first pixel transistor, turning on the second pixel transistor, turning off the third pixel transistor, and supplying a second image signal to the first liquid crystal element, the first capacitor, the second liquid crystal element, and the second capacitor from the first signal line;
in a fifth period, performing display in the reflective pixel portion in response to the second image signal supplied in the fourth period; and
repeating the fourth period and the fifth period so that a still image is displayed.

21. The method for driving a liquid crystal display device, according to claim 20,
wherein the first image signal is an image signal corresponding to any color of R, G, and B, and
wherein a backlight which emits the corresponding color of R, G, and B is sequentially operated in the second period.

22. The method for driving a liquid crystal display device, according to claim 20,
wherein the second image signal is an image signal for displaying an image at a lower grayscale level than an image of the first image signal.

23. The method for driving a liquid crystal display device, according to claim 20,
wherein time for displaying one image in the fourth and fifth periods is longer than time for displaying one image in the first to third periods.

24. The method for driving a liquid crystal display device, according to claim 20,
wherein supply of a driver circuit control signal for driving the scan line and the first signal line is stopped in the fifth period.

25. The method for driving a liquid crystal display device, according to claim 20, further comprising the step of:
switching between a first mode including the first to third periods and a second mode including the fourth and fifth periods.

26. The method for driving a liquid crystal display device, according to claim 20, further comprising the step of:
switching between a first mode including the first to third periods and a second mode including the fourth and fifth periods on the basis of the first or second image signal.

27. The method for driving a liquid crystal display device, according to claim 20,
wherein a frame frequency is higher than or equal to 60 Hz in the first to third periods.

28. The method for driving a liquid crystal display device, according to claim 20,
wherein a frame frequency is lower than or equal to 0.017 Hz in the fourth and fifth periods.

29. The method for driving a liquid crystal display device, according to claim 20, further comprising the step of:
controlling a backlight by an optical sensor in the fifth period.

* * * * *